United States Patent [19]

Cowan et al.

[11] 4,428,843

[45] * Jan. 31, 1984

[54] WELL WORKING COMPOSITIONS, METHOD OF DECREASING THE SEEPAGE LOSS FROM SUCH COMPOSITIONS, AND ADDITIVE THEREFOR

[75] Inventors: Jack C. Cowan, Lafayette, La.; Tommy Thrash, Littlefield, Tex.; Jerry R. Rayborn, New Orleans, La.

[73] Assignee: Venture Chemicals, Inc., Lafayette, La.

[ * ] Notice: The portion of the term of this patent subsequent to Oct. 26, 1999 has been disclaimed.

[21] Appl. No.: 269,494

[22] Filed: Jun. 1, 1981

[51] Int. Cl.$^3$ .............................. C09K 7/02; C09K 7/06
[52] U.S. Cl. .......................... 252/8.5 C; 252/8.5 LC; 252/8.5 M; 252/8.55 R
[58] Field of Search ............ 252/8.5 C, 8.5 M, 8.55 R, 252/8.5 LC

[56] References Cited

U.S. PATENT DOCUMENTS

| | | | |
|---|---|---|---|
| 2,119,829 | 6/1938 | Parsons | 252/8.5 |
| 2,209,591 | 7/1940 | Barnes | 252/8.5 |
| 2,477,219 | 7/1949 | Van Dyke | 252/8.5 |
| 2,599,745 | 6/1952 | Campbell et al. | 252/8.5 |
| 2,797,196 | 6/1957 | Dunn et al. | 252/8.5 |
| 2,816,073 | 12/1957 | Stratton | 252/8.5 |
| 3,310,125 | 3/1967 | Darley | 252/8.5 |
| 3,629,102 | 12/1971 | Lummus | 252/8.5 |
| 4,240,800 | 12/1980 | Fischer | 44/51 |
| 4,356,096 | 10/1982 | Cowan et al. | 252/8.5 |

*Primary Examiner*—Herbert B. Guynn
*Attorney, Agent, or Firm*—Roy F. House

[57] ABSTRACT

The invention provides well-working fluid compositions containing certain hydrophobic organophilic water wettable fibrous materials to decrease the seepage loss of the fluid to subterranean formations in which the fluid is being used. Also disclosed is a process of reducing the seepage loss of well working fluids utilizing such fibrous materials.

13 Claims, No Drawings

WELL WORKING COMPOSITIONS, METHOD OF DECREASING THE SEEPAGE LOSS FROM SUCH COMPOSITIONS, AND ADDITIVE THEREFOR

The invention relates to compositions for use in well-working operations such as drilling, workover and completion, packing and the like, well-working processes utilizing such compositions, and an additive to reduce the seepage loss of the compositions to the formation.

In the rotary drilling of wells for oil and gas, drilling fluids ("muds") are circulated in such a manner as to remove cuttings and to support the walls of the hole. The fluids may be either water base, comprising for example, clay, polymers, weight material and other additives dispersed in water, or oil base, comprising for example, suspending agents (generally organophilic clays), emulsifiers, stability agents, filtration control agents, weighting agents, and other additives dispersed in diesel oil and the like oleaginous mediums, all as are well known in the art.

A thin, low-permeability filter cake on the sides of the borehole is necessary to control the filtration characteristics of the drilling fluid since the pressure of the mud column in the borehole is greater than the formation pressure. A filter cake forms when the drilling fluid contains particles of a size only slightly smaller than the size of the pore openings of the formation. The liquid which enters the formation while the cake is being established is known as the surge loss or spurt loss, while the liquid which enters after the cake is formed as the drilling fluid filtrate. The permeability of the filter cake is directly related to the particle size distribution in the drilling fluid and, in general, the cake permeability decreases as the concentration of particles in the colloidal size range increases.

The filtration properties required for the successful completion of a well depend on the nature of the formations being drilled and on the type of drilling fluid used. Thus in water sensitive formations, oil base mud provides superior hole stabilization when the salinity of the aqueous phase of the mud is adjusted to prevent migration of water from the mud to the formation.

Both the spurt loss and filtration rate must be minimized when penetrating potentially productive formations in order to minimize any damaging effects from fluids entering the formation. These properties should also be minimized throughout the drilling process when using oil base muds because of the high cost of these muds.

Through the years there have been used, and proposed for use, many materials to decrease the filtration rate of drilling fluids. These include starch and starch derivatives, water soluble cellulose derivatives, humates, lignin derivatives, clays, polymers and emulsified oil droplets in water base muds, and asphaltic materials, organophilic clays, organophilic humates, organophilic lignosulfonates, emulsified water droplets, and the like in oil base muds. However, there are few effective materials to decrease the spurt loss or seepage of whole mud to the formation. Materials which have been used include cotton seed hulls, mica, vermiculite, nut shells, coal, asbestos, bagasse, paper, and various particulate wood products.

Accordingly, there is a need for a seepage or spurt loss control agent which is effective in both aqueous and nonaqueous fluids.

It is an object of the present invention to provide well working compositions having a low seepage or spurt loss.

It is another object of this invention to provide a process of decreasing the seepage or spurt loss of a well working fluid.

These and other objects of this invention will appear to one skilled in the art as the description thereof proceeds.

In accordance with one illustrative embodiment of our invention, we have found that certain hydrophobic, organophilic, water wettable fibrous materials (hereinafter sometimes referred to as HOWWFM) are effective in both oil base and water base fluids to decrease the seepage loss or spurt loss thereof.

The term "hydrophobic" as used herein indicates that the fibrous material will float when added to water. The term "organophilic" as used herein indicates that the fibrous material will preferentially sorb oil and collect in the oil phase when added to a mixture of oil and water. The term "water wettable" as used herein indicates that the fibrous material will be wetted by water when agitated in water, as by mixing.

The HOWWFM which are useful in this invention include naturally occurring fibrous materials or synthetic fibers which have been treated to render them hydrophobic and organophilic while maintaining their ability to be wet with water. Such treatments may be chemical, thermal, mechanical, or combinations thereof. The extent of surface treatments must not be such as to render the fibrous material incapable of being wetted when agitated with water.

Suitable HOWWFM and treatments thereof are disclosed in the following U.S. Pat. Nos., incorporated herein by reference: 2,211,976-treated cellulose fibers; 3,464,920-organosilane treated materials; 3,536,615-carbon coated particulate materials; 3,562,153-particulate materials coated with a colloidal hydrophobic metal or metalloid oxide; 3,791,990-dried peat; and 4,240,800-dried bagasse.

Cellulose fibers may be rendered hydrophobic by incorporating therein a phenol containing at least one aliphatic or cycloaliphatic residue having at least 6 carbon atoms, and treating the fibers with an aliphatic aldehyde. The phenol and aldehyde treatments may be effected simultaneously, or their condensation product may be used directly, and the treated fibers subjected to heat treatment.

Cellulose may also be rendered hydrophobic by surface treating cellulose with a Lewis-acid type catalyst and initiating polymerization of a hydrocarbon monomer to form a surface coating of a hydrocarbon polymer on the cellulose. Thus cellulose dried to a moisture content of 3% can be cooled to $-80°$ in nitrogen and treated with a solution of $BF_3$ in liquid nitrogen. Isobutylene or $\alpha$-methylstyrene polymerize almost instantaneously upon contacting the treated cellulose.

The particle size of the HOWWFM must exhibit a wet screen analysis of at least 90% by weight passing through a 100 mesh (U.S.) screen. That is, at least 90% by weight of the HOWWFM present in a water suspension will pass through a 100 mesh screen.

The hydrophobic, organophilic and water wettable character of the HOWWFM is very important as it allows this material to be utilized in both oil base and water base fluids. Although hydrophobic and organophilic, the HOWWFM readily wets in water containing a surfactant or upon agitation to reduce the seepage or spurt loss of aqueous well working fluids. Furthermore, the HOWWFM is effective in all aqueous systems including saturated brines.

The well working compositions of our invention can be prepared by adding the HOWWFM to any water base or oil base well working fluid. A water base well working composition will generally contain a suspending agent, such as a clay or polymer, weight material which may be insoluble, such as barite, siderite, galena, ilmenite, hematite, and the like, or which may be a soluble salt such as sodium chloride, potassium chloride, calcium chloride, calcium bromide, zinc bromide, and the like, fluid loss control additives such as starch, CMC, carboxymethyl starch, polyacrylates and other polymers, and other additives such as viscosity control agents, lubricants, emulsifiers, lost circulation materials, oil, and other functional additives. Oil base well working fluids will generally contain additives which provide these same functions, with the exception of the lubricants. Representative suspending agents are the organophilic clays. Representative weight materials are the insoluble materials enumerated above. Representative fluid loss control additives are asphaltic materials, organophilic humates, organophilic lignosulfonates, polymers and the like. Representative emulsifiers are calcium soaps, such as calcium tallate, fatty amides, partial fatty amides of polyamines, and the like.

Another embodiment of our invention is a process to decrease the seepage loss or spurt loss of a well working fluid, particularly drilling fluids, which comprises adding to the well working fluid a quantity of HOWWFM sufficient to effect such decrease. Generally, there will be required from about 2 pounds per 42 gallon barrel (ppb.) to about 50 ppb., preferably from about 4 ppb. to about 20 ppb.

A high boiling point liquid hydrocarbon of the type used in oil base well working fluids, such as diesel oil, can be added to water base well working fluids containing the HOWWFM or to which the HOWWFM is to be added. The HOWWFM sorbs the oil and concentrates it in the filter cake on the sides of the well thus further decreasing the seepage loss from the well working fluid. Generally up to about 20 ppb. oil will be added.

The following non-limiting examples are given to further illustrate the invention.

EXAMPLE 1

A HOWWFM was prepared by treating raw, untreated cotton linters with 1.5% by weight dry HCl gas at a temperature in the range from about 130° F. to about 160° F. for about 10 minutes in an apparatus designed to tumble the cotton linters. Thereafter the treated cotton linters were buffed, screened and air classified. This HOWWFM is hydrophobic, organophilic and water wettable as evidenced by the fact that it floats when added to water, it preferentially sorbs and collects oil from a mixture of oil and water, and that it is readily wetted when agitated in water. Ninety-six percent by weight of the HOWWFM, when suspended at a concentration of 5% by weight in water, with agitation, will pass through a 100 mesh screen.

The HOWWFM was mixed into a 10.8 ppg. (pounds per gallon) lignosulfonate field drilling fluid in various amounts as listed in Table 1. Thereafter the standard API RP 13B reology was determined. The ability of the drilling fluid to seal off a porous sand was evaluated in the following manner: 100 grams of course blasting sand was placed in an API filter press with only the screen in place (no paper), water was added, and the water drained to remove the free water; 350 ml. of the drilling fluid were then added to the cell and 100 psi differential pressure was applied as in the standard API fluid loss test; thereafter the fluid which seeped through the sand pack was caught until the sand pack was sealed, i.e., when only drops of fluid emerged from the sand pack. The volume of fluid which seeped through the sand pack until an effective seal was formed was measured. The data are given in Table 1.

The data indicate that the HOWWFM in concentrations of 4–50 ppb. reduced the seepage loss from "no shut-off" to 2 ml. before sealing this unconsolidated sand pack. Pretreatment of the entire mud system up to 20 ppb. in such low density muds can be made to incrementally reduce seepage loss without significantly altering the rheological properties of the muds. Concentrations above this level can be utilized by the use of surfactants/dispersants.

EXAMPLE 2

Six ppb. of the HOWWFM of Example 1 were mixed into an oil base field mud. This mud had a diesel oil/water ratio of 80/20 (volume/volume), an aqueous phase saturated with calcium chloride, and contained commercially available suspending agent, emulsifiers, and fluid loss additive. Thereafter the standard API RP 13B emulsion stability, rheology and fluid loss were measured. The ability of the drilling fluid to seal a one inch thick bed of 20 mesh sand was determined as in Example 1. The data obtained are given in Table 2.

The data indicate that the HOWWFM was a very effective sealant for oil base muds.

In cases of severe seepage loss, a concentrated wiping pill can be prepared in water or oil containing up to about 150 ppb. of HOWWFM and circulated in the borehole.

EXAMPLE 3

A HOWWFM was prepared by separating the fibers from peat as disclosed in U.S. Pat. No. 3,791,990. Thereafter the fibers were ground such that 95% of the fibers passed through a 100 mesh screen after suspension in water at a concentration of 5% by weight. The fine fibers were then dried to a moisture content of 9%, as disclosed in U.S. Pat. No. 3,791,990 to render the fibers hydrophobic and organophilic. The fibers remained water wettable, however, as evidenced by the fact that they were wetted when mixed into water containing a surfactant.

This HOWWFM was evaluated at a concentration of 20 ppb. as in Example 1. The data obtained are given in Table 3.

The data indicate that this HOWWFM was an effective sealant.

EXAMPLE 4

A HOWWFM was prepared from bagasse according to the teachings of Example 1 in U.S. Pat. No. 4,240,800 and ground such that 97% of the fibers passed through a 100 mesh screen after suspension in water at a concentration of 5% by weight. The fine fibers contained about 2% moisture.

This HOWWFM was evaluated at a concentration of 20 ppb. as in Example 1. The data obtained are given in Table 3.

The data indicate that this HOWWFM was an effective sealant.

TABLE 1

|  | Comparative Example 1 | A | B | C | D | E | F |
|---|---|---|---|---|---|---|---|
| HOWWFM, ppb. | 0 | 4 | 6 | 10 | 20 | 50 | 50 |
| Surfactant, ppb. | 0 | 0 | 0 | 0 | 0 | 0 | 10 |
| Plastic Viscosity, cp. | 9 | 9 | 12 | 11 | 16 | 27 | 17 |
| Yield Point, lb./100 sq. ft. | 10 | 10 | 3 | 7 | 6 | 67 | 57 |
| Sealing Test Shut-off Volume, ml. | None | 100 | 50 | 35 | 17 | 2 | 2 |

TABLE 2

|  | Comparative Example 2 | Example 2 |
|---|---|---|
| HOWWFM, ppb. | 0 | 6 |
| Plastic Viscosity, cp. | 73 | 76 |
| Yield Point, lb./100 sq. ft. | 11 | 12 |
| 10-sec. gel., lb./100 sq. ft. | 12 | 12 |
| 10-min. gel., lb./100 sq. ft. | 13 | 13 |
| Emulsion Stability, volts | 625 | 600 |
| Sealing Test |  |  |
| Shut-Off Volume, ml. | 130 | 15 |
| Shut-Off Time, sec. | 95 | 3 |

TABLE 3

|  | 20 ppb. HOWWFM | |
|---|---|---|
|  | Example 3 | Example 4 |
| Plastic Viscosity, cp. | 23 | 14 |
| Yield Point, lb./100 sq. ft. | 9 | 7 |
| Sealing Test Shut-Off Volume, ml. | 23 | 20 |

We claim:

1. An oil base well-working fluid comprising a major proportion of oil and a minor proportion but sufficient to substantially lower the seepage loss of a hydrophobic, organophilic, water wettable fibrous material comprising cotton which has been treated to be hydrophobic and organophilic, said fibrous material having a particle size such that at least 90% by weight thereof present in a water suspension will pass through a 100 mesh screen.

2. The fluid of claim 1 wherein the amount of said fibrous material is from about 2 to about 50 pounds per 42 gallon barrel of said fluid.

3. The fluid of claim 1 which contains a fluid loss additive.

4. The fluid of claim 3 wherein said fluid loss additive is selected from the group consisting of asphaltic materials, organophilic humates, and organophilic lignosulfonates.

5. A water base well-working fluid comprising a major proportion of water and a minor proportion but sufficient to substantially lower the seepage loss of a hydrophobic, organophilic, water wettable fibrous material comprising cotton which has been treated to be hydrophobic and organophilic, said fibrous material having a particle size such that at least 90% by weight thereof present in a water suspension will pass through a 100 mesh screen.

6. The fluid of claim 5 wherein the amount of said fibrous material is from about 2 to about 50 pounds per 42 gallon barrel of said fluid.

7. The fluid of claim 5 which contains a fluid loss additive.

8. The fluid of claim 7 wherein said fluid loss additive is selected from the group consisting of starch, carboxymethyl cellulose, carboxymethyl starch, and polyacrylates.

9. In a process of drilling a well wherein there is circulated in the well a drilling fluid subject to seepage loss into permeable formations penetrated by the well, the method of decreasing the seepage loss to said formations which comprises admixing with said drilling fluid an effective amount of a hydrophobic, organophilic, water wettable fibrous material comprising cotton which has been treated to be hydrophobic and organophilic, said fibrous material having a particle size such that at least 90% by weight thereof present in a water suspension will pass through a 100 mesh screen.

10. The process of claim 9 wherein the amount of said fibrous material is from about 2 to about 50 pounds per 42 gallon barrel of said drilling fluid.

11. The process of claim 9, or 10, wherein said drilling fluid is a water base drilling fluid which contains up to about 20 ppb. of a liquid hydrocarbon.

12. The process of claim 9 wherein said drilling fluid is an oil base fluid which contains a fluid loss additive.

13. The process of claim 9 wherein said drilling fluid is a water base fluid which contains a fluid loss additive.

* * * * *